United States Patent Office 2,719,092

Patented Sept. 27, 1955

2,719,092

PIGMENT PRODUCTION

Frank A. Grady, Detroit, Mich.

No Drawing. Application October 2, 1951, Serial No. 249,409

8 Claims. (Cl. 106—307)

This invention relates to pigment production and, more particularly, to a pigment uniquely suitable for use in photoengraving or lithographic art layout work and the production thereof.

The art of photoengraving requires the provision of metal printing plates having a design provided in relief for typographical printing. One of the fundamental requisites for reproducing drawings or art work in a photoengraving process consists in the particular art of half-tone engraving wherein continuous tones of photographs or drawings are broken up into separate printing elements.

In order to provide a reticulated printing surface corresponding in general pattern to an image subject having gradated tone areas and no-tone areas, a photographic negative is made of an art layout constituting the image subject and the exposure is made through a half-tone screen providing a grating in the form of crossed rulings, ranging from 40 to 400 lines to the inch, and leaving transparent openings through which the light passes to form a half-tone or dot image on the photographic plate or film. When the half-tone negative is developed, the tone areas are represented by a plurality of dots which vary in cross sectional area according to the gradated tones of the original art layout but are of more or less uniform opacity. A print is made from the negative, usually on a metal plate, provided with a photographically sensitive surface according to a well known technique so that a dot pattern stands out in relief on the surface of the plate to provide a reticulated surface constituting separate printing elements.

When art layouts developed by artists are to be reproduced in half-tone, it is desirable that a so-called "high light negative" be made in which the high lights of the drawing and other no-tone areas do not show the screen pattern. In other words, under ordinary circumstances, when copy is reproduced in half-tone by photographing it through a half-tone screen, the clear white or no-tone areas will be reproduced in the half-tone negative as tiny dots which, on the ultimate printing plates, will reproduce the clear white areas as a slight tone or gray thereby taking away from the printed reproduction of the original art layout the high light effectiveness of the original copy.

Heretofore the production of high light negatives has been attempted in many different ways. For example, one method heretofore used involved the deliberate over-exposure of the half-tone negative so as to completely erase the screen-like pattern appearing in high light areas. As a result of such over-exposure, the fine dot pattern which would normally appear in relief on the metal plate is in effect erased. In using this method the other dot patterns representing various tone areas are correspondingly reduced in size so that the metal plate is incapable of accurately reproducing the desired tones on the paper.

Another method for the production of dot-free high light areas is that suggested in U. S. Patents No. 2,395,985 and 2,395,986, issued to Berry. In the Berry process, the original art layout is prepared on a sheet of pretreated drawing paper, which has thereon a finely divided layer of a fluorescent material of a type adapted to emit photographically actinic rays upon irradiation. Such a fluorescent material is adapted to receive violet or ultra-violet light rays and to emit light of longer wave lengths in the visible range. By the use of the pretreated drawing paper of Berry it is alleged that it is possible to obtain extra bright no-tone or high light areas and thereby to exaggerate the difference in reflectivity between the high light areas and the normal black and gray tone areas in the drawing. In the Berry process the artist prepares a drawing on the pretreated board by drawing the desired black and gray tone areas thereon. A photographic negative is then made of the art layout through a half-tone screen. After normal exposure of the negative in the "screened" camera, the normal source of illumination is shut off and an irradiating ray specifically suitable for activating the fluorescent material is directed against the art layout to cause the normally high light areas of the pretreated paper to fluoresce and thereby to give off a light which is strongly actinic with respect to the negative and is intended to effectively close up the high light dots.

Another method, described in U. S. Patent No. 2,276,718, issued to Crosby, involves the use of a pretreated sheet of drawing paper which may be turned bright yellow in color by spraying with a chemical. After or during the drawing of the desired art work upon the pretreated sheet of paper, the chemical is sprayed onto the paper in those areas in which various shades of gray tones are desired. By the use of such chemically activated tone areas, it is alleged that it is possible to accomplish the elimination of the high light dots.

Still another method is the method described in U. S. Patent No. 2,191,939, issued to Marx. In the Marx process the artist employs a pigment composition in the preparation of his art layout in which a chemical solution comprising a fluorescent material absorbent of ultra-violet light is used to dilute the artists' lampblack. It is appreciated, of course, that ordinarily in such art work the artist would obtain a particular desired gray tone by the dilution of artists, lampblack with water. In the Marx process the special fluorescent solution must be employed as a diluent instead of water since the normal use of water by artists would be wholly incompatible with the Marx process.

After normal exposure in the screened camera in the Marx process, a special filter which transmits only ultra-violet light is interposed between the camera and the art work and preferably the screen is moved or is altered in position. During the latter exposure, the high light or no-tone areas of the art work will continue to reflect the ultra-violet light, but the tone areas will tend to absorb the ultra-violet light and fluoresce or reflect light of a longer wave length which cannot pass through the special filter.

In preparing art work, or in making the so-called "wash drawings," one of the standard techniques employed by the artists is to "roll" tones from a dark solid black to various gradations of gray including a faint first tone which is very close to pure white. Tones are frequently "rolled" by artists through the copious use of water which the artist mixes with a lampblack pigment. A "rolled tone" is also sometimes made by first wetting the board or paper surface with water and then applying the lampblack pigment to the wetted surface. Since the Marx process involves the dilution of lampblack with a fluorescent solution, the washing or addition of water to obtain a roll tone is precluded, and accordingly, the artists are greatly restricted in the practice of their technique and artistry.

Moreover, the particular chemicals employed in the fluorescent solution quickly destroy the expensive camel hair brushes which are frequently employed by artists in preparing copy work and art layouts.

It has also been discovered that the exposure of the Marx art copy (prepared with such fluorescent type chemicals) to humidity or sunlight will destroy the ultra-violet absorptive character of the copy layout. Apparently, the fluorescent type absorbent material is absorptively efficient only when it appears on the surface of the copy layout in solution, in given concentrations and at a given pH, a condition which of course exists only temporarily. It can thus be seen that it is frequently necessary that the entire copy be recreated by the artist. In some instances, if the deterioration in the ultra-violet light absorbing efficiency is not too great, the copy layout may be reactivated by spraying with suitable chemicals, otherwise the production of a high light negative from the particular copy work must be accomplished by some other procedure.

An additional difficulty, of particular importance to artists, resides in the fact that corrections cannot be made on the prepared copies ordinarily used in the art. In the Marx process, the absorptive character of the corrected portion differs appreciably from the remainder of the copy layout apparently because the condition of the fluorescent chemical in solution constantly changes.

It will also be readily appreciated that in the other processes hereinbefore mentioned wherein a pretreated sheet of drawing paper is used, corrections or erasures cannot be effected except in unusual situations, since the particular light absorbing or reflecting characteristics inherent in the pretreated drawing sheet could ordinarily not be reproduced.

It should also be pointed out that the use of the fluorescent solution of Marx to accomplish dilution of the lampblack to obtain a suitable tone is very difficult to control because in the case of particularly light tone it is necessary to use an appreciable amount of the solution to dilute the lampblack. The relatively large amount of solution so used increases very appreciably and disproportionately the ultra-violet light absorbing characteristics of that particular tone area, the net result of which is a sharp edge or cut-off between the tone areas and the high light areas. Such a characteristic defect is termed in the trade as a "hard edge." Also, the control of the fluorescent solution itself upon particularly absorbent drawing paper is complicated by such phenomena as capillary action.

The instant invention is based upon the discovery of a black pigment which may be used in substantially the same way that commercial artists' lampblack may be used, but which has unusually high light-absorbing properties with respect to ultra-violet and blue light.

The instant pigment may be employed by the artist to prepare a black and gray-toned drawing on an ordinary sheet of drawing paper and with water as a pigment diluent to form a suitable art or copy layout. The copy layout so obtained may be illuminated by the ordinary unfiltered light sources used in the art and a half-tone negative may be obtained by normal exposure thereto in the screened camera. Then the screen may be removed and the half-tone negative may be selectively over-exposed so as to drop out of the film image the high light areas without closing the gradated tone areas. In other words, these tone areas obtained by the use of the instant pigment possess such unusual light-absorbing properties that, during the selective over-exposure, the tone areas do not lose their correct relation and dot size before veiling over of the high light dots is accomplished.

By the use of the instant pigment, there is thus produced a faithful reproduction copy of an art layout in a high lighted half-tone negative in which vignette effects are accurately captured and gradations of tone density are faithfully reproduced.

It is therefore an object of the present invention to provide an improved pigment having selectively high light-absorption properties with respect to light at predetermined wave lengths and a method for the preparation thereof.

It is also an object of the present invention to provide an improved pigment that may be used for the production of half-tone negatives in the photoengraving or lithographic art.

It is a further object of the present invention to provide an improved pigment which may be used on ordinary untreated drawing paper in the photoengraving art.

It is still another object of the present invention to provide an improved pigment which may be employed in the photoengraving art without the use of special camera lamps, special light sources, or highly restrictive light filters, such as filters transmitting ultra-violet only.

It is still a further object of the instant invention to provide an improved pigment which may be diluted with water and otherwise used in place of commercial artists' lampblack in the photoengraving art.

It is another object of the instant invention to provide a pigment which may be used to prepare art copy for photoengraving without the use of special or harmful chemicals in combination therewith.

It is yet another object of the instant invention to provide an improved pigment which may be used in the photoengraving art in the making of half-tone negatives wherein high lighted areas may be dropped out and in which vignette effects may be faithfully reproduced in accordance with normal techniques employed by artists.

It is yet a further object of the present invention to provide an improved pigment which has unusual light-absorbing properties and which does not deteriorate with respect thereto under ordinary environmental circumstances—especially humidity and sunlight.

A further object of the present invention is to provide an improved pigment which may be used in the photoengraving art for making a high lighted half-tone negative in which a hard edge is eliminated.

Many other features, advantages and additional objects of the present invention will become manifest to those versed in the art upon making reference to the detailed description which follows:

The pigment of the instant invention is a carbon based black pigment, more particularly, a pigment comprising a homogeneous particulate mixture of a blue light absorbent material, an ultra-violet light absorbent material and an amount of black carbon pigment sufficient to render the entire mixture black. As such, the instant pigment has substantially the same artistic characteristics as the so-called "commercial artists' lampblack." The pigment is used by an artist in making copy or an art layout and a half-tone negative is made by photographing the copy through a half-tone screen. A brief added exposure is then made with the screen removed during which the high light and no-tone areas are dropped out through the veiling over of the screen dots without detriment to the normal tone areas of the copy of art layout.

As used herein, the term "black carbon pigment" means pigments of the class known as "carbon blacks" as well as pigments of the class known as "carbonaceous blacks." The carbon blacks consist of practically pure carbon in the amorphous condition and there are two principal species thereof, namely, gas blacks, derived from incomplete combustion of gases, and lampblacks, derived from incomplete combustion of oils. The carbonaceous blacks consist essentially of mineral matter colored by carbon or carbonaceous matter. The carbonaceous blacks include those of animal origin, such as bone-black; those of vegetable origin, such as charcoal blacks and those of mineral origin such as black chalk or mineral blacks. Another form of carbon, "graphite," is ordinarily not used in pigments but its use is not precluded in the instant invention, since it would not interfere with the light-absorbing characteristics of the instant pigment.

It is understood, of course, that the black carbon pigments of the instant invention must be suitably ground to pigment particle size, for example, to a particle size sufficiently small to pass through a 300 mesh screen and preferably to a size of not more than about two microns. Also, the usual additives, such as preservatives and binders which are ordinarily incorporated in commercial artists' lampblacks, may be incorporated in the black carbon pigment used in the instant invention. Such additives include small amounts of glycerin as a preservative and small amounts of gum arabic or egg albumen as a binder.

Preferably, the black carbon pigment employed in the instant invention is, in fact, a commercial artists' lampblack. For example, a typical composition of a commercial artists' lampblack is as follows:

100 grams carbon black (lampblack preferably) finely ground
50 grams bone-black—finely ground
5 cc. glycerin
3 cc. gum arabic or 3 cc. egg albumen.

The principal constituent of artists' lampblack, and preferably of the black carbon pigment used herein, is a carbon black. Carbon blacks are preferred for use in the instant invention because it is possible to prepare carbon blacks of particle size and texture that are particularly suitable for use in art work. Most preferably, the black carbon pigment of the instant invention consists essentially of lampblack, which is readily available commercially and which has been found to be particularly suitable for use in combination with the other ingredients employed in the instant invention.

According to the principles of the present invention advantages are obtained by the use of the blue light and ultra-violet light absorbent materials in the pigment of the instant invention, the choice of which is based to a certain extent on certain observations and discoveries made in connection with the art of half-tone photoengraving and lithographing. High lighted half-tone negatives are most frequently produced on so-called "orthochromatic" film or "process" film which is photographically sensitive through a spectral range from about 3400 Å. (Angstrom units) to about 6000 Å. Although the photographically sensitive components of the film are sensitive below 3400 Å. practically all camera lenses effect an absorption of light rather than a transmission of light at wave lengths below about 3400 Å.

According to conventional practice in the photoengraving art, the sources of illumination used during the production of a half-tone negative or a high lighted half-tone negative most frequently comprise either mercury tube or carbon arc lights.

The mercury tube type of illumination source emits a line spectrum having intensities varying at particular parts of spectral range. According to the commercial sources from which mercury tube types of lamps are available, the emission characteristics of a mercury tube light are approximately as follows between 3500 Å. to 5700 Å.:

| Angstrom Units | Percentages | Colors |
|---|---|---|
| 3,650 | 10.5 | 33.5% ultraviolet light. |
| 3,700 | 1 | |
| 3,980 | 22 | |
| 4,350 | 30 | 30% blue. |
| 5,400-5,700 | 35 | 35% green. |

Carbon arc lights emit a continuous spectrum from about 2000 Å. to about 7000 Å.

According to the general principles of the present invention the instant pigment which is used for the preparation of copy layouts has light absorptive characteristics carefully correlated to the environmental operating conditions established through the normal use of conventional film and conventional lighting sources.

In general, it has been found that a very substantial per cent of the total effective light energy with respect to the orthochromatic film is either ultra-violet or blue light. In the case of the mercury tube type illumination source, there is also an appreciable amount of green light. However, in the case of carbon arc light it has been found that approximately 60% of the emitted light is ultraviolet or near ultra-violet ranging from 3400 Å. to 4000 Å., about 30% of the emitted light is blue light ranging from 4000 Å. to 4600 Å. and only about 10% of the light emitted is blue-green or green, ranging from about 4600 Å. to 5700 Å. Hence, the great majority of effective light in the case of carbon arc light is within the range from about 3400 Å. to about 4800 Å.

In any event, it can be seen that a very substantial amount of the effective light emitted from either type of light source is either ultra-violet light or blue light.

It is appreciated, of course, that black carbon pigments, particularly lampblack, are well known compounds which possess high absorptivity with respect to both ultra-violet light and blue light and, in fact, with respect to light in the entire spectral range. As a consequence, black carbon pigments possess the distinctive color characteristic of a body which is capable of absorbing an appreciable amount of light at all wave lengths, namely, the color black.

In making a black and white drawing for an art layout, the artist washes down the black lampblack pigment to obtain desired gray shades, or alternatively, he employs grays of predetermined shades, in order to prepare a drawing having precisely the black-gray-and-white shadings and high lights which he desires to be reproduced. In the instant invention, the artist employs the pigment of the invention in the same manner that he would employ ordinary artists' lampblack to prepare his art layout work since it is because of the unusual light absorptive properties of the additional ingredients of the pigment of the invention that the lightly shaded or low tone areas in the art layout copy may be faithfully reproduced, even though over-exposure is employed for the purpose of removing the high light dots.

It may be noted that, even though a black carbon pigment itself is a very effective actinic light-absorbing medium, it is also an effective "black" coloring ingredient. Thus, in the instant pigment, it has been found possible to incorporate therein additional ingredients which are essentially "colorless" but which are capable of selectively absorbing light over predetermined wave length ranges of actinic light with respect to the orthochromatic film. In other words, the artist uses the instant pigment to prepare his art layout precisely as he desires to see his artistry reproduced. However, the pigment of the present invention contains additional ingredients which superficially have no effect upon the visual appearance of the black pigment, although such ingredients are capable of absorbing an appreciable amount of the light which would otherwise activate the orthochromatic film. What appears to the artist to be a 20% gray, for example, is actually perhaps a 30% gray vis a vis the orthochromatic film. Accordingly, during normal exposure of the film in the screened camera, the 20% gray on the artist's copy effects a (photographic) reaction upon the film equivalent to that of about a 30% gray, but during over-exposure of the film for the purpose of removing all the "gray" pattern or dots from high lighted areas, the net effect on the film is to reduce the 30% gray area to approximately the desired 20% gray area while the high lighted areas have been "dropped out."

The blue light absorbing material used in the invention is a material capable of absorbing light of wave lengths ranging from about 4000 Å. to about 4900 Å. It is generally recognized that 4000 Å. defines the boundary line between ultra-violet light and visible blue-violet light; and 4900 Å. defines the boundary between blue-green light and green light.

It is understood, of course, that unless a material is essentially a black body it tends to absorb much more light in certain wave length ranges than it does in others. As hereinbefore explained, the blue-light absorbing material of the present invention is not a black body, but instead is a material selectively capable of absorbing blue-light and relatively less capable or even substantially incapable of absorbing light of other wave lengths. In other words, the blue-light absorbing material of the invention has its maximum absorptivity within the wave length range of about 4000 to 4900 Å.

As used herein, the term "absorptivity" means the per cent of the total incident light which is absorbed by the exposed surface of a given material. Absorptivity is thus contrasted to reflectivity which is the per cent of the light reflected from a surface, based on the total incident light.

In the practice of the invention, the blue light absorbing material should ordinarily have an absorptivity of at least about 40% and preferably about 50% throughout the preferred wave length range, which is about 4000–4600 Å. Also, it is desirable that the blue light absorbing material have a peak absorptivity within the wave length range of about 400–4600 Å., preferably at about 4300 Å., and the peak absorptivity is preferably at least about 70%.

Among the most important blue light absorbing materials suitable for use in the instant invention are the yellow pigments. The yellow pigments ordinarily used commercially are materials which are peculiarly able to absorb blue light and reflect yellow light. The yellow pigments include the yellow chromes, yellow oxides of iron, cadmium yellow (cadmium sulfide), arsenic yellow (arsenic sulfide), Naples yellow (lead antimoniate), Turner's yellow (lead oxychloride) and Aureolin (cobalt potassium nitrate).

It has been found that the yellow chromes are preferred for use in the instant invention, such chromes including the lead, barium, and zinc chromes. Most preferably, the lead chromes are used. Examples of the lead chromes which have been found to be particularly suitable for use in the instant invention include medium lead chromate, lemon lead chromate and primrose lead chromate. It is understood, of course, that the yellow pigments include the usual orange or reddish pigments which do not necessarily exhibit a yellow color exclusively, since in the instant pigment composition the particular ingredient desired is a blue light absorbing ingredient.

In addition, the blue light absorbing ingredients used in the instant invention should have the ordinary pigment properties of water-insolubility and fine particle size. Preferably, the blue light absorbing ingredient is ground to substantially the same particle size as that of the black carbon pigment, so that there is no appreciable interference or irregularity imparted to the normal black carbon pigment smoothness or texture by the addition of blue light absorbing ingredients. Also, the blue light absorbing ingredient should possess physical and chemical pigment properties which permit its use in combination with the black carbon pigment to form a stable homogeneous mixture that may be combined with a suitable vehicle, such as water, to form a free flowing drawing pigment having substantially the same properties as commercial artists' lampblack.

The ultra-violet light absorbing material used in the invention is a material capable of absorbing light of wave lengths ranging from about 3400 Å. to about 4000 Å. It has been found that about 3400 Å. is the minimum wave length of light that the ordinary camera lens is capable of transmitting. Preferably, the ultra-violet light absorbing material has its maximum absorptivity within the wave length range of about 3500–3800 Å., and within that range the material should have at least about 50% absorptivity. Also, the optimum absorptivity peak of the material should be in the neighborhood of 3650 Å. and the absorptivity at the peak should be at least about 70%.

Another important aspect of the instant invention resides in the fact that the ultra-violet light absorbing material used in the invention is not a fluorescent material. By that is meant that the ultra-violet light absorbing material is not a material which converts impinging light energy to a light of a different or longer wave length, and then transmits or reflects the light of changed wave length. In general, fluorescence is a phenomenon which involves the absorption of light energy of a given wave length (e. g. ultra-violet light) and the transmission or reflectance of such energy in the form of light of a longer wave length (e. g. blue light). In the instant invention the ultra-violet light absorbing material is not a fluorescent material and, therefore, the ultra-violet light absorbing material does not add to the light energy reflected by the instant pigment in wave lengths above that of ultra-violet light.

Among the ultra-violet light absorbing materials which have been found to be particularly useful in the practice of the instant invention are certain 1,3,5-triazine derivatives, which are described in detail in U. S. Patent No. 2,171,427 issued to Eggert and Wendt. Such compounds are ultra-violet light absorbing-reactive, non-fluorescent 1,3,5-triazine derivatives. Those triazine derivatives found to be particularly useful in the invention are:

N - [2,4 - dihydroxy - 1,3,5 - triazyl - (6)] - dehydrothio-toluidine sulfonic acid:

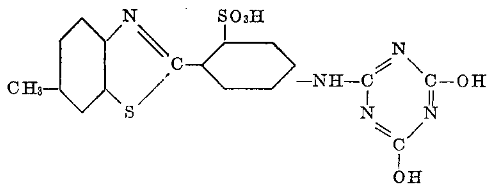

and bis - [2,4 - dihydroxy - 1,3,5 - triazyl - (6)] - diamino-diphenyl urea disulfonic acid:

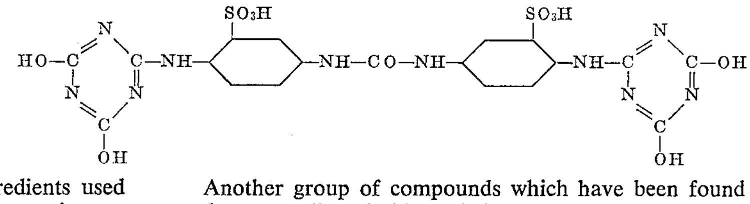

Another group of compounds which have been found to be unusually suitable and therefore preferred for use in the instant invention are certain hydrazine derivatives having the following generic formulae:

$$R{-}NH{-}NH{-}R' \quad \text{and} \quad R''{-}\overset{\displaystyle O}{\overset{\|}{C}}{-}NH{-}NH{-}\overset{\displaystyle O}{\overset{\|}{C}}{-}R'''$$

wherein R, R′, R″ and R‴, are each organic radicals. Such compounds containing the non-fluorescent, ultra-violet light absorbingly reactive —NH—NH— or —CO—NH—NH—CO— bonds have been found to possess the properties suitable for use in the instant invention. It is apparent that the radicals R″—CO— and R‴—CO—, as shown in the above formula and as shown in the specific examples hereinafter, are acyl radicals. The specific examples of compounds used and set forth hereinafter also show that these compounds are aldehyde-hydrazine addition products. In particular, such compounds have been found to be uniquely adapted to fine grinding in order that they may be reduced to substantially the particle size of the black carbon pigment without an appreciable decrease in the absorptivity thereof.

Among those hydrazine derivatives found to be particularly suitable for use in the instant invention are dihydroxyl-napthalazines such as:

4,4-dihydroxyl-2′,2-naphthalazine

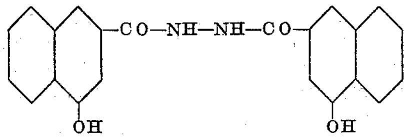

and 2′,2-dihydroxyl-1′,1-naphthalazine

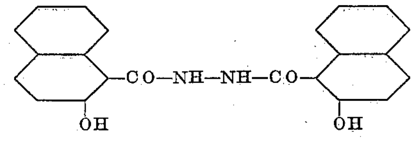

Furfuralazine (di-furfuraldeyhyde hydrazine)

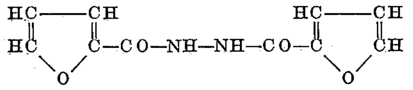

and cinnamalazine (di-cinnamaldehyde hydrazine)

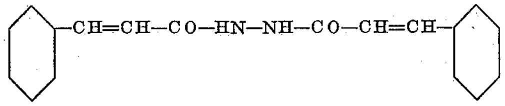

It has been found that furfuralazine is most preferred for use in the instant invention.

It is also to be understood that the ultra-violet light absorbing ingredients, like the blue light absorbing ingredients, should have the ordinary pigment properties of water-insolubility and grindability, at least to a particle size small enough to pass a 300 mesh screen and preferably not more than 2 microns. The ultra-violet light absorbing material must be capable of grinding to substantially the same particle size as that of the black carbon pigment without the loss of its light absorbing properties. The foregoing hydrazine derivatives have been found to be particularly suitable in this respect.

In addition, the ultra-violet light absorbing material must possess the characteristic pigment properties of stability and suitability for combination with the pigment-like blue light absorbing material and the black carbon pigment, in order to obtain a black pigment having suitable texture and particle size and having the ability to be combined with the vehicles to form a free flowing artists' pigment of substantially the same properties as those of commercial artists' lampblack.

One of the particular advantages of the afore-mentioned hydrazine derivatives resides in their generally colorless appearance. It is appreciated, of course, that color in either the blue light absorbing material or the ultra-violet light absorbing material is not a fatal defect for the purposes of the instant invention. In fact, it is significant that colored ingredients are sometimes more desirable than colorless or pale, slightly colored ingredients, since some colored ingredients tend to increase the apparent black color of the final black pigment mixture.

In general, the amount of black carbon pigment that is used in the pigment mixture of the invention is an amount at least sufficient to render the entire mixture black. In other words, the amount used is an amount sufficient to impart to the mixture substantially the same black color as that of commercial artists' lampblack.

The amount of black carbon pigment used in the instant pigment mixture in order to obtain a suitable black color may vary to some extent because of the particular masking or black-coloring properties of the specific black carbon pigment employed. On the other hand, considering commercial artists' lampblack as typical of the black carbon pigment, the amount of such lampblack that is used in the practice of the instant invention may range from as little as about 25%, if the other ingredients are only lightly colored or substantially colorless, to as much as about 75%, if the other ingredients possess a distinct strong color. As used herein the term "per cent" means per cent by weight, in connection with proportions or amounts of ingredients recited. The minimum amount of black carbon pigment that may be used in the practice of the instant invention is that amount necessary to impart a suitable black color to the final pigment mixture, but the maximum amount that may be used depends to an appreciable extent upon the minimum amount of additional light-absorbing properties which are to be imparted to the final pigment mixture. Thus, if the minimum appreciable amount of additional light-absorbing properties is to be imparted to the pigment mixture the amount of black carbon pigment that is used may be as much as 95%.

Similarly, the amount of the ultra-violet light and blue light absorbing ingredients which may be used in the practice of the invention is limited to the maximum amount which may be used without appreciably altering the desired black color of the pigment mixture and to the minimum amount that may be added in order to impart an appreciable additional light-absorbing property to the pigment.

Ideally, the amount and the type of the ingredients employed as the ultra-violet light and the blue light absorbing material in the instant invention is such that the additional light-absorbing properties of the resulting pigment mixture are such that the absorptivity peaks thereof conform generally with the emitted light energy peaks of the light source which would ordinarily pass through the screened camera lens. On the other hand, exact correlation is not necessary since the principal object is to effect an overall reduction in the total amount of actinic light reflected from the tone areas in the art work.

The ordinary commercial light source emits actinic light having about equal proportionate amounts of ultra-violet light and blue light. Accordingly, in a composition of the invention to be prepared for commercial distribution as an improved artists' lampblack, it is ordinarily preferred to incorporate therein equal proportions of ultra-violet light absorbing material and blue light absorbing material. The amount of each of such materials thus used may range from the least amount which imparts an appreciable effect (i. e. about 2½%) to the maximum amount which may be used without causing appreciable alteration of the ultimate black color desired (i. e. about 35%). Preferably the amount of each used ranges from about 20% to about 30%, if the ingredients are added in equal proportions.

Another important aspect of the instant invention resides in the fact that the proportions of each of the light-absorbing ingredients may be altered to suit a particular purpose. For example, if it is desired to prepare an artists' lampblack embodying the instant invention for use with a light source such as a carbon arc wherein 60% of the light energy is ultra-violet and only 30% of the light energy is blue light, the amount of the light-absorbing materials may be adjusted correspondingly. In such case, two parts of the ultra-violet light-absorbing material would be used with one part of the blue light absorbing material. Specific examples of such compositions, which have been used successfully in the practice of the instant invention, include compositions having the following formulas:

(1) 40 grains—4,4′ dihydroxyl-1,1′ naphthalazine
20 grains—primrose lead chromate
40 grains—artists' prepared lampblack.

(2) 40 grains—2,2′ dihydroxyl-1,1′ naphthalazine
20 grains—medium lead chromate
40 grains—lampblack.

(3) 40 grains—furfuralazine
20 grains—lemon lead chromate
40 grains—lampblack.

(4) 35–50 grains—cinnamalazine
15–10 grains—primrose lead chromate
50–40 grains—lampblack.

(5) 20 grains furfuralazine
20 grains medium orange lead chromate
60 grains lampblack.

It will be noted that in Formula (4), the weight ratio of the ultra-violet light absorbing material to the blue light absorbing material may be as high as 5 to 1. Such a formula may be used very effectively with the carbon arc type light source and also it may be used more effectively than the others listed if a light source is employed that emits a greater proportion of ultra-violet light than does the carbon arc light source. In fact, in special instances involving the use of such a light source it has been found that the blue light absorbing material may be omitted (e. g. in a 7:3 furfuralazine:lampblack mixture).

It has been found that, in the practice of the invention, it is preferable to combine the light absorbents and (commercial) lampblack in weight ratios ranging from about 3:2 to 2:3. The ultra-violet light and blue light absorbent weight ratios are preferably from about 1:5 to 5:1. As the foregoing formulas indicate the optimum weight ratio for lampblack:ultra-violet light absorbent:blue light absorbent is about 6:2:2 to about 4:5:1; the optimum weight ratio for ultra-violet light absorbent:blue light absorbent being from about 1:1 to about 5:1.

The flexibility of the instant invention is of substantial importance, since it is not absolutely necessary that the amounts of each of the absorbing ingredients employed correspond exactly to the proportionate amounts of the two types of light emitted by the light source. It is thus possible to employ effectively substantially more of an ultra-violet light absorbing material (e. g. cinnamalazine) than the distribution of the types of light emitted would warrant, without appreciably altering the absorbing power of the pigment mixture. The main advantage of such flexibility resides in the fact that one of the light absorbing ingredients may be particularly well suited for combination with the black carbon pigment, whereas the other may be comparatively less compatible or more brightly colored.

In the newspaper industry, copy reproduced in high lighted half-tone negative form has a required 25% first tone dot size because by the time a mat is made from the original plate and then stereotyped, the dot size will have closed down to about 10% (which is about the minimum dot size that can be effectively employed). When the stereotype is operated to prepare the newsprint the dot size printed appears to be about 20% because of the high absorptivity for ink possessed by the relatively inexpensive blotting type of newspaper employed.

The instant invention is particularly effective in making art work for reproduction as high lighted half-tone negatives for newspaper work because it is possible to obtain a predetermined effect by the use of selected amounts of the light absorbent ingredients in the pigment. It has been found that the absorption efficiency in terms of holding a dot size open in the first tone next to white may be increased by about 2½% by increasing the proportion of light absorbing ingredients in the pigment mixture by about 10%. In other words, assume first that an art layout has been prepared using an artists' lampblack embodying the invention containing 40% light absorbing materials, and that the lampblack has been rolled onto the art copy so as to obtain a shaded or tone area which appears to the eye to be a 20% tone area and which by virtue of the additional light absorbing characteristics thereof will result in a 20% tone dot size on the negative after the high lights are veiled by over-exposure. Then, if an identical art layout were prepared from an artists' lampblack embodying the invention but containing 50% light absorbing materials, and the negatives were subjected to the same exposure and over-exposure, the net result would be a first tone having a 22.5% tone dot size. This particular aspect of the invention is particularly useful when applied to the process of preparing artists' "grays."

Although some artists obtain the particular shade of gray they desire to use in art layout work by rolling commercial artists' lampblack, other artists employ grays. The grays so employed comprise a series of prepared gray pigments, for example, one for each of eight different tones of shades of gray obtained by combining lampblack with suitable amounts of white opacifiers. In using the grays the artist merely selects the particular gray pigment which has the desired color or density which he wishes to employ, and that particular gray pigment is applied to the art layout work as such, as contrasted to the use of the lampblack and rolling or washing thereof to reduce the shade to the desired gray tone.

In the practice of the instant invention, if it is desired to produce a particular gray pigment, for example, one corresponding to a 20% tone and it is desired to employ such a gray in a process wherein it will be necessary to over-expose the negative to drop out the high light areas to such an extent that a 30% tone area would be reduced to a 20% tone area, a suitable gray may be prepared to compensate for such over-exposure by the use of the instant black pigment mixture. In other words, instead of using ordinary lampblack, the black pigment of the present invention could be combined with opacifying agents in the preparation of the various grays.

Since it is necessary to compensate for a loss of approximately 10% tone dot size during over-exposure, it can be seen that the amount of light-absorbing materials incorporated in the instant black pigment should be 40% (i. e., 10% of the absorbing material to compensate for each 2.5% tone loss). It can thus be seen that the instant invention includes a procedure for the preparation of a predetermined gray tone that is to be employed in a photoengraving process wherein a tone loss of $x$% would be caused by sufficient over-exposure to veil the high light dots. In preparing a gray pigment, the amount of the black pigment used therein preferably contains a predetermined amount of the light-absorbing materials, namely $10x/2.5\% = 4x\%$.

Another very important advantage of the instant invention resides in the fact that different extra light-absorbing properties may be imparted to different grays, in a predetermined manner. Thus, a 20% gray may be prepared having actinic light absorbing properties equivalent to a 30 or 40% gray; whereas a 60% gray may be prepared having actinic light-absorbing properties equivalent to only a 65% gray, for example.

It will be understood that a pigment to be used as lampblack according to the present invention will preferably possess a predetermined per cent of extra light absorbing properties so that rolling down of the tone by dilution with water will correspondingly reduce the extra light-absorbing ability of the rolled down pigment. It is, therefore, unnecessary to complicate the control of the extra light-absorbing properties by the dilution of the lampblack with a special light absorbent vehicle and the production of hard edges is substantially avoided in the final prints.

Also, the pigment-like characteristics of the ultraviolet and the blue light absorbents make it possible to maintain given predetermined proportions of each in combination with the lampblack during such operations as rolling or washing. Since the light absorbents are not water soluble, no problems are created during preparation of the layout copy such as those problems caused by capillary action or by evaporation of the water vehicle. Corrections, erasures or additions may be made on the layouts, without impairing the light absorbent characteristics.

No highly restrictive light filters, for example, filters capable of transmitting ultra-violet light only are used. Moreover, the instant pigment is designed to operate effectively with standard light sources during regular exposure and over-exposure. The most advantageous uses of my composition in the photoengraving art are more particularly described in my co-pending application entitled "Method of Producing Photographically Highlighted Half Tone Negatives" filed concurrently herewith.

Details of composition may be varied without departing from the principles of this invention and I, therefore, wish to embody within the scope of the patent warranted hereon all such modifications as would reasonably come with the scope of my contribution to the art.

I claim as my invention:

1. A pigment comprising (*a*) lampblack, (*b*) an azine compound of the class consisting of dihydroxyl-napthalazine, di-furfuraldehyde hydrazine, dicinnamaldehyde hydrazine, N-[2,4-dihydroxy-1,3,5-triazyl-(6)]-dehydrothio-toluidine sulfonic acid, and Bis-[2,4-dihydroxy-1,3,5-triazyl (6)]-diamino-diphenyl urea disulfonic acid, (*c*) a yellow pigment of the class consisting of primrose lead chromate, lemon lead chromate, medium lead chromate, yellow oxides of iron, cadmium yellow, arsenic yellow, Naples yellow, Turner's yellow and aureolin, the weight ratio of (*a*) to (*b*) plus (*c*) being from 2:3 to 3:2, the weight ratio of (*b*) to (*c*) being from 5:1 to 1:5.

2. A black pigment comprising (*a*) a carbon black pigment, (*b*) di-furfuraldehyde hydrazine, and (*c*) medium lead chromate, the weight ratio of (*a*) to (*b*) plus (*c*) ranging from 1:3 to 19:1 and the weight ratio of (*b*) to (*c*) ranging from 5:1 to 1:5, each of (*a*), (*b*) and (*c*) being ground to pigment particle size.

3. A black pigment comprising 40 parts of artist's lampblack, 50 parts of di-cinnamaldehyde-hydrazine and 10 parts of primrose lead chromate, all of which have been ground to a pigment particle size of not more than about two microns.

4. A black pigment comprising 40 parts of artist's lampblack, 40 parts of di-furfuraldehyde hydrazine and 20 parts of lemon lead chromate, all of which have been ground to a pigment particle size of not more than about two microns.

5. A black pigment comprising 7 parts of furfuralazine and 3 parts of artists' lampblack.

6. A black pigment comprising (*a*) artist's lampblack, (*b*) di-furfuraldehyde hydrazine, and (*c*) medium lead chromate, the weight ratio of (*a*) to (*b*) plus (*c*) ranging from 1:3 to 19:1 and the weight ratio of (*b*) to (*c*) ranging from 5:1 to 1:5, each of (*a*), (*b*) and (*c*) being ground to pigment particle size.

7. A black pigment comprising 60 parts of artist's lampblack, 20 parts of di-furfuraldehyde hydrazine and 20 parts of medium lead chromate.

8. A black pigment comprising (*a*) a carbon black pigment, (*b*) a di-hydroxyl-naphthalazine, and (*c*) a yellow pigment, the weight ratio of (*a*) to (*b*) plus (*c*) ranging from 1:3 to 19:1 and the weight ratio of (*b*) to (*c*) ranging from 5:1 to 1:5, each of (*a*), (*b*) and (*c*) being ground to pigment particle size.

References Cited in the file of this patent

UNITED STATES PATENTS

| | | |
|---|---|---|
| 2,043,860 | Morgan | June 9, 1936 |
| 2,171,427 | Eggert et al. | Aug. 29, 1939 |
| 2,269,984 | Munder | Jan. 13, 1942 |
| 2,304,838 | Marx, Jr. | Dec. 15, 1942 |

FOREIGN PATENTS

| | | |
|---|---|---|
| 591,275 | Great Britain | Aug. 13, 1947 |